May 19, 1970

R. E. BERCHTOLD ET AL 3,512,472

COOKING UTENSIL

Filed June 15, 1967

INVENTORS
Robert E. Berchtold
Edward E. McCullough

Edward E. McCullough
AGENT

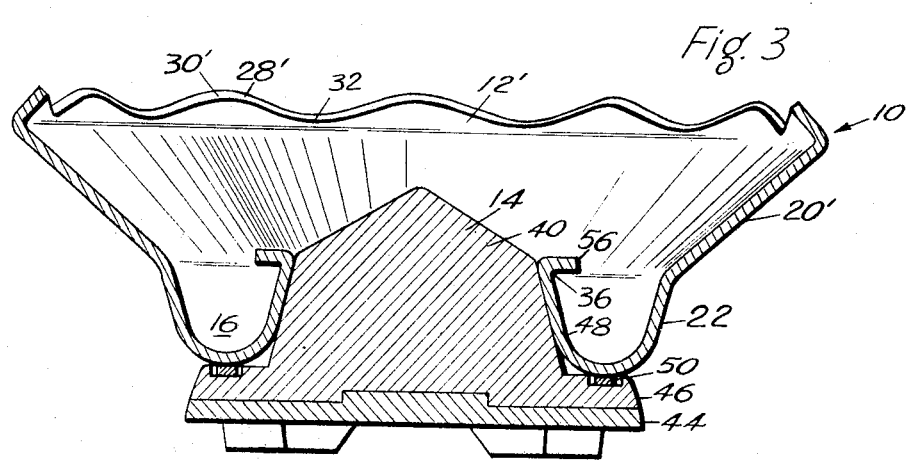
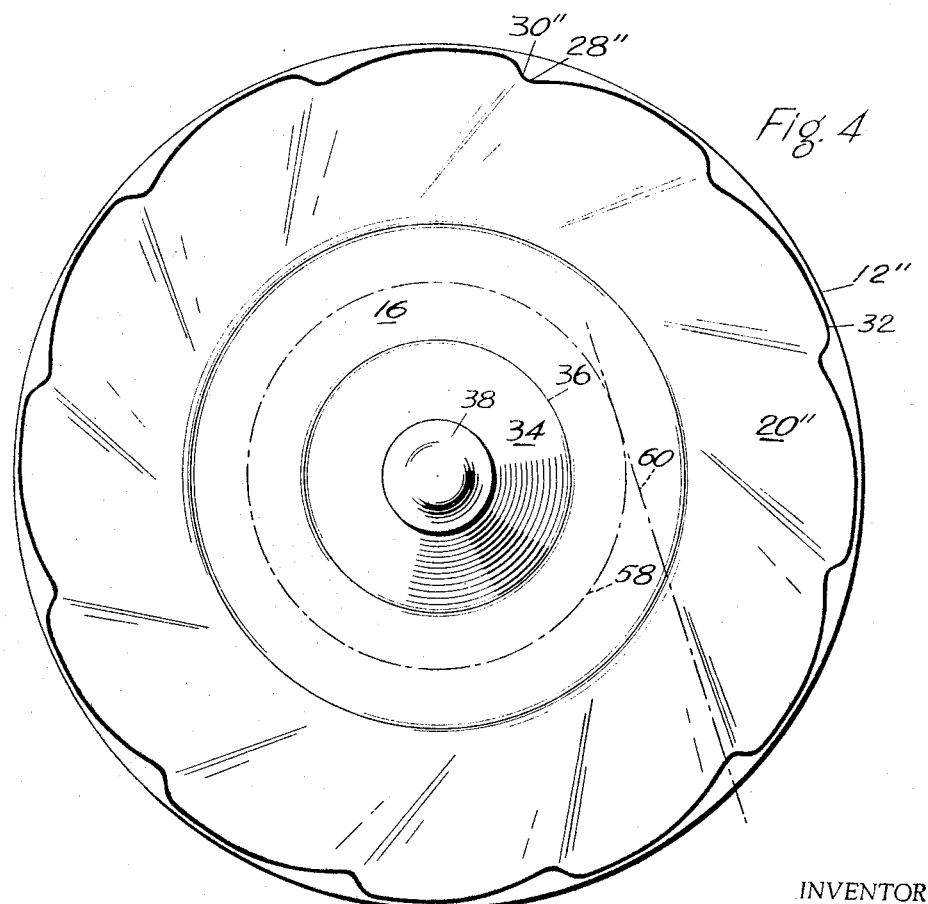

United States Patent Office 3,512,472
Patented May 19, 1970

3,512,472
COOKING UTENSIL
Robert E. Berchtold, Box 46, and Edward E. McCullough, 14 Sumac Way, both of Brigham City, Utah 84302
Filed June 15, 1967, Ser. No. 646,269
Int. Cl. A47j 37/12
U.S. Cl. 99—403
10 Claims

ABSTRACT OF THE DISCLOSURE

A cooking utensil for fondue cooking, consisting essentially of a dish having an annular trough for containing the cooking liquid, an annular flange fixed to the outer edge of the trough and sloping upwardly and outwardly therefrom at an angle such that food on skewers that rest on the flange may be immersed in the cooking liquid, and an electric heater shaped to support the dish so that a heating element thereof is adjacent the trough.

Figure 1:
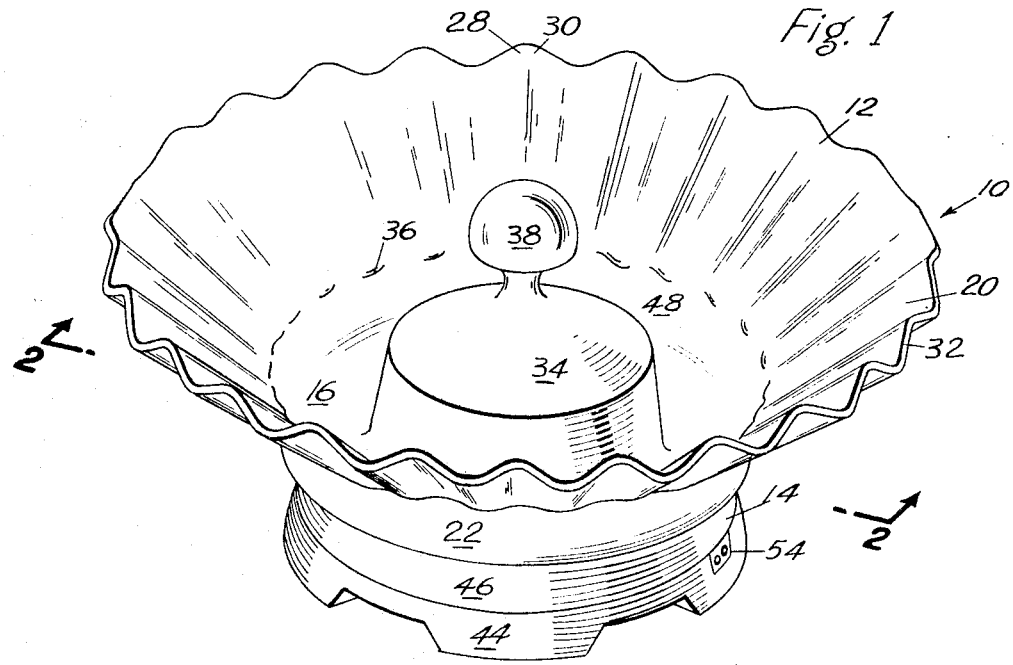

This invention relates broadly to cooking utensils; and, more particularly, it relates to utensils for deep-liquid, fondue cooking.

The conventional fondue cooker is a metallic vessel held over an alcohol burner by a supporting member such as an annulus on legs. The cooker is customarily filled with cooking oil heated to the appropriate temperature by the alcohol burner; and the cooking is ordinarily done by several participants, immersing pieces of food on skewers in the hot oil.

Each skewer rests on the edge of the cooking vessel; and, so that the handle portion of the skewer does not overbalance the food and withdraw it from the oil, the food end of the skewer is ordinarily placed in a portion of the vessel diametrically opposite the point at which the handle end rests against the edge of the vessel. When several skewers are being used simultaneously this results in a crossed-skewer situation in the vessel, making it inconvenient to withdraw the cooked food without losing it in the vessel. Another disadvantage of the conventional cooker is that, since a fairly large quantity of oil must be used, the device is wasteful of oil; and, since a small area of oil relative to the volume thereof is exposed to heat, a considerable time is required to heat the oil to cooking temperature. Also, the large amount of hot oil is hazardous, being difficult to handle safely.

The present invention, which overcomes these disadvantages, consists essentially of a cooking dish having an annular trough for containing a cooking liquid, an annular flange sloping upwardly and outwardly from the outer edge of the trough, and an electric heater that fits the dish so that a heating element thereof is adjacent the trough of the dish.

An object of the invention is to provide a utensil for deep-liquid, fondue cooking that is economical of the cooking liquid and safe to use.

Another object of the invention is to provide such a utensil that will promote an orderly arrangement of skewers therein and insure immersion of the food in the cooking oil.

Another object of the invention is to provide such a utensil that exposes the cooking liquid to a large heating surface, relative to the volume of liquid, so that cooking temperature thereof is quickly attained.

Other objects and advantages of the invention will become apparent as it is disclosed in the following description and accompanying drawings, wherein the same parts are designated with identical characters throughout the disclosure.

Figure 2:
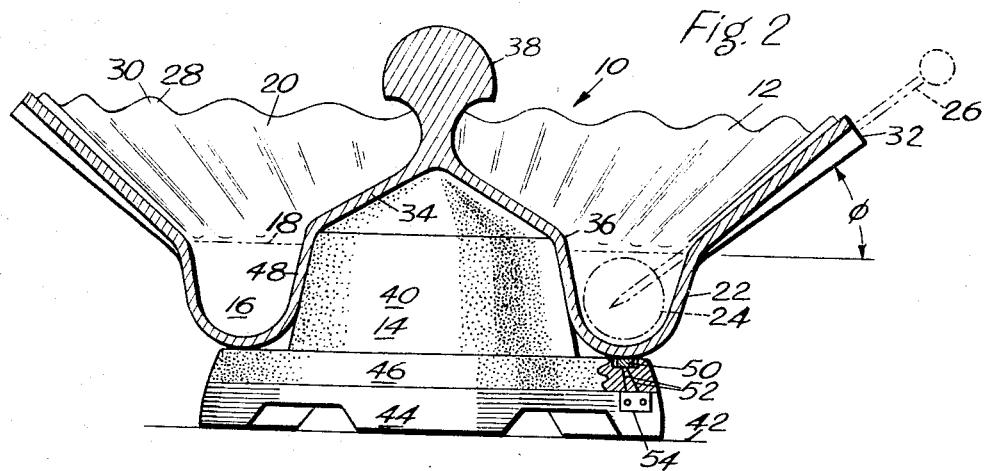

In the drawings:

FIG. 1 is a perspective view of a preferred embodiment of the invention;
FIG. 2 is a sectional view taken on the line 2—2 of FIG. 1;
FIG. 3 is a view similar to FIG. 2, but showing a second embodiment of the cooking dish; and
FIG. 4 is a top view of a third embodiment of the cooking dish.

A preferred embodiment of the invention, illustrated in FIG. 1, is a fondue cooker 10 comprising the cooking dish 12 and an electric heater 14 that fits and supports the dish 12.

The dish 12 has an annular trough 16 for containing the cooking liquid customarily an oil, indicated in FIG. 2 by the phantom line 18. An annular support flange 20, fixed to the outer side 22 of the trough 16, slopes upwardly and outwardly therefrom at an angle $\phi$ to the horizontal such that a piece of food 24 on the end of a skewer 26 resting on the flange 20 may be well immersed in the oil 18. The angle $\phi$ is also greater than the angle of repose for the skewer 26 resting on the flange 20, so that the weight of the skewer 26 prevents the food 24 from floating to the surface of the oil 18 and thereby being only partially cooked. Both the food 24 and the skewer 26 are shown in phantom lines, since they are not a part of the present invention. The flange 20 is equipped with guide means 28 to promote orderly arrangement of the skewers 26 thereon. The guide means 28 in this embodiment are radially-extending, raised portions 30 on the flange 20. The outer edge 32 of the support flange 20, being the primary point of support for the skewer 26, must be outwardly of the balance point or center of gravity of the food-laden skewer 26 when the food is immersed in the oil. Hence, any support that provides such an edge and can support the skewer 26 at an appropriate angle to the trough 16 can be used as an equivalent to the flange 20. A cone 34 connects the inner edge 36 of the trough 16 to a central knob 38, which serves as a handle.

The heater 14 is essentially a block 40 of refractory material such as ceramic having a general conical form. It is separated from the supporting surface 42 by a thermal-insulator base 44, made of a material having low thermal conductivity, such as hardwood. The inner side 48 of the trough 16, being of the same conical shape as the upright surface of the block 40, restricts lateral motion of the dish 12 on the heater 14. An annular heating element 50 is seated in an annular shelf 46 adjacent the bottom portion of the trough 16 for maximum exposure of the oil to heat. Obviously, the annular heating element 50 could also be arranged adjacent either the inner or outer sides of the trough 14. Electrical conductors 52 connect the heating element 50 to an electrical connector 54, for connection to a power source not shown.

FIG. 3 illustrates a second embodiment of the cooking dish 12', which is similar to that of FIG. 1 except that the cone 34 and the knob 38 are omitted and the guide means 28' are upturned scallops 30' fixed to the outer edge of the flange 20'. It may be noted that the scallops 30' could also be arranged along the inner edge of the flange 20'. Also this embodiment of the invention is equipped with a projection 56 fixed to the inner edge 36 of the trough 16 and extending over a portion thereof so that a piece of food on a skewer will be prevented from floating to the surface of the cooking oil by the projection 56. Hence, in this embodiment of the invention, the angle of the flange 20' to the horizontal may be less than the angle of repose for a skewer thereon in order to insure immersion of food in the cooking oil.

FIG. 4 illustrates a third embodiment of the cooking dish 12", which is identical to that of FIG. 1 except that the guide means 28" are raised portions 30" on the flange 20″ arranged tangentially to the annular centerline 58 of the trough 16 and extending to the outer edge of the flange 20″. A centerline 60 of one guide 28″ is extended to show this relationship. It may be seen that the radial length of the flange in this embodiment may be shorter than that of FIG. 1 and still offer the same supporting length for a skewer, since the guide means 28″ are not arranged along the shortest distance from the inner edge to the outer edge of the flange 20″.

An invention has been described wherein several problems and disadvantages relating to conventional fondue cookers have been solved. It minimizes the use of cooking oil, distributes it in an annular trough presenting a large surface area to the heating elements so that it reaches cooking temperature very rapidly, and it incorporates provisions for orderly arrangement of the skewers and food, and for insuring immersion of the food in the cooking oil. Although the embodiments of the invention have been described with considerable specificity with regard to detail, it is apparent that such details may be altered without departing from the scope of the invention as defined in the appended claims. For example, it is apparent that lateral movement of the dish 12 relative to the heater 14 may be restricted by an annular rim fixed to the heater and contacting the annular outer side of the trough 16, as well as by the upright surface 46 contacting the annular inner side of the trough 16 as described.

What is claimed is:

1. A cooking dish for deep fat cooking comprising:
an annular trough for containing the cooking fat;
an annular flange fixed to the outer edge of said trough and sloping upwardly and outwardly thereof;
a hollow cone, downwardly divergent and integrally attached to the inner side of said trough, whereby said cone may (1) actually form the inner side of said trough, creating the annularity thereof, (2) cooperate with a conical, upright surface on a heater to restrict lateral movement of said dish thereon when fitted over said surface, and (3) form a base for a handle; and
a handle fixed to the upper portion of said cone.

2. The cooking dish of claim 1 further including guide means on said flange for orderly positioning of skewers thereon so that said skewers will not cross one another, making withdrawal of food from said dish difficult.

3. The cooking dish of claim 2 wherein said guide means are radially-extending raised portions on said support flange.

4. The cooking dish of claim 2 wherein said guide means are upturned scallops on an edge of said support flange.

5. The cooking dish of claim 2 wherein said guide means are raised portions thereon, tangential to the annular centerline of said trough and extending to the outer edge of said flange.

6. The cooking dish of claim 1 further including a projection fixed to the inner edge of said trough and extending over a portion thereof so that a piece of food on a skewer may be immersed thereunder in said cooking liquid, whereby said food is prevented from floating on said liquid.

7. A fondue cooker comprising:
a cooking dish having an annular trough, refractory at cooking temperatures, for containing a cooking liquid therein, a support flange fixed to the outer edge of said trough and sloping upwardly and outwardly therefrom at an angle such that food on the end of a skewer may be immersed in said cooking liquid when said skewer is resting on said flange; and
an electric heater including a block of refractory material, at least a portion of the upright surface of which fits that of an annular side of said trough so that said annular side is in intimate contact with said block and so that lateral movement of said cooking dish relative to said heater is thereby restricted, a heating element seated in the surface of said block adjacent said trough for heating said cooking liquid therein, and electrical conductors attached to said heating element to conduct electricity thereto from a power soure.

8. The fondue cooker of claim 7 wherein the inner side of said trough forms the surface of a truncated cone; said block of refractory material has an upright surface shaped to fit that of said inner side of said trough; an annular shelf fixed to said block and concentric therewith; and said heating element is annular, adjacent said trough, and concentric therewith.

9. The fondue cooker of claim 7 wherein said support flange is annular and slopes upwardly and outwardly from said trough at an angle greater than the angle of repose for a skewer supported thereon.

10. The fondue cooker of claim 9 further including guide means in the form of raised portions on said flange for promoting orderly arrangement of skewers thereon.

References Cited

UNITED STATES PATENTS

| | | | |
|---|---|---|---|
| 591,513 | 10/1897 | Watrous | 99—422 |
| D.143,485 | 1/1946 | Hensley. | |
| D.170,074 | 7/1953 | Blanko. | |
| 1,467,272 | 9/1923 | Hazlehurst | 99—425 |
| 1,621,315 | 3/1927 | D'Evlyn | 126—385 |
| 1,650,999 | 11/1927 | Preston | 219—432 |
| 2,607,338 | 8/1952 | Parenti | 126—385 |
| 3,038,402 | 6/1962 | Singer | 99—403 |
| 3,283,696 | 11/1966 | Randolph | 99—425 |

FOREIGN PATENTS

| | | |
|---|---|---|
| 2,043 | 1/1911 | Great Britain. |
| 287,265 | 3/1928 | Great Britain. |
| 629,810 | 9/1949 | Great Britain. |

WALTER A. SCHEEL, Primary Examiner

A. O. HENDERSON, Assistant Examiner

U.S. Cl. X.R.

D44—1(8.3); 99—419; 220—69